Aug. 15, 1950  A. J. ROTH  2,518,641
AUTOMOBILE TOWING DEVICE
Filed Oct. 25, 1946

INVENTOR.
ARTHUR J. ROTH
BY
ATTORNEY.

Patented Aug. 15, 1950

2,518,641

UNITED STATES PATENT OFFICE 2,518,641

AUTOMOBILE TOWING DEVICE

Arthur J. Roth, Detroit, Mich.

Application October 25, 1946, Serial No. 705,743

4 Claims. (Cl. 280—33.14)

This invention relates to automobile towing devices, the object being to devise a bar having end curved end portions at each end to engage the inner face of the bumper on both towing and towed cars and includes a chain and a spring to yieldably maintain the bar in contact with the bumper irrespective of variation in level of the two automobiles.

These and other features and objects of the invention are hereinafter and more fully described and claimed and a tow bar involving my invention is shown in the accompanying drawing in which—

Figure 1:
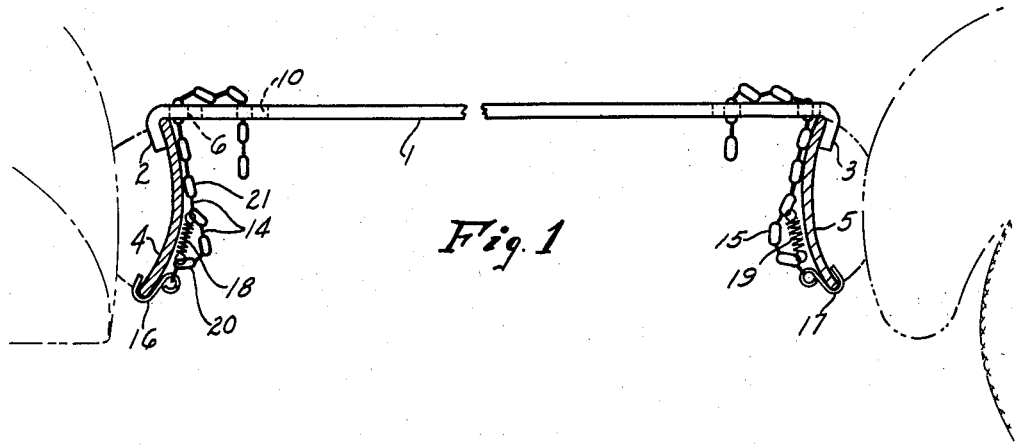
Fig. 1 is an elevation of the tow bar showing the character and arrangement of parts of my improved tow bar when in use.
Figure 2:
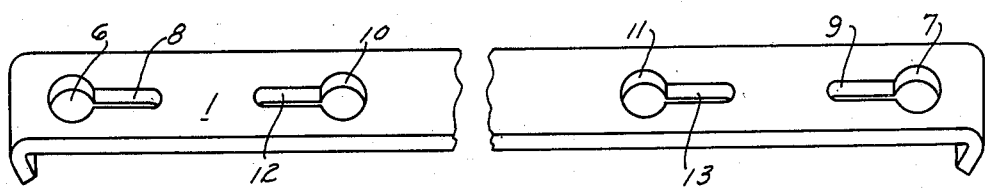
Fig. 2 is a perspective view of the bar itself.

My improved tow bar comprises a sheet metal bar 1 of sufficient thickness to withstand the strain to which the bar is subjected in use. The bar has a portion 2 and 3 at its respective ends engaged over the upper surface of the bumpers 4 and 5 of the respective automobiles. The bar has an aperture 6 and 7 at its respective ends and a slot 8 and 9 extends inwardly from the respective apertures 6 and 7 and positioned inwardly in respect to the end apertures are like apertures 10 and 11 having slots 12 and 13 opening to the respective apertures and extending toward the slots 8 and 9 of the end apertures.

The means for attaching the bar to the respective bumpers comprises a chain 14 for the bumper 4 and a similar chain 15 for the bumper 5. These respective chains have a hook 16 and 17 that engages the lower edge of the respective bumpers as shown in Fig. 1.

The chains 14 and 15 are each provided with a coiled spring 18 and 19 respectively and a loop end 20 of each spring is hooked into a link adjacent the terminal end of the chain and is provided further with a loop end 21 that engages a link of the chain a sufficient distance from the first link to provide a series of free links. This arrangement permits the spring to vary in length under the strain in the variation of the level of the respective bumpers in passing over uneven surfaces and maintains the bar in pressure contact with the respective bumpers.

In securing the bar in position the end of the chain opposite the hook end is passed through the aperture 6 and a link is passed edge-wise into the slot 8 opening to the aperture 6 and the free end of the chain is passed through the aperture 10 and introduced into the slot 12. The chain is thus securely fixed in relation to the bar. The chain 15 is likewise passed through the aperture 7 of the bar and a link thereof introduced in the slot 9 and the free end of the chain is thus inserted through the slot 11 and a link thereof passed into the slot 13. Both chains are therefor securely fixed to the bar and provide slack portions between the links to which the respective springs are attached.

By the described arrangement of parts, it is obvious that the bar may assume a position of angle to the horizontal through variations in level of the respective bumpers without liability of the bar becoming disengaged from either bumper.

The device as hereinbefore described and shown in the drawings is comparatively simple and inexpensive in structure and by the described arrangement of the springs and chains the position of the bumpers may vary in a vertical plane without the bar becoming disengaged therefrom.

Having thus briefly described my invention, its utility and mode of operation, what I claim and desire to secure by Letters Patent of the United States is:

1. An automobile towing device comprising a non-flexible bar having the respective end portions inturned at an angle to the plane of the bar, said bar having an aperture adjacent each end, each aperture having a slot extending inwardly towards the other, a pair of chains each having a hook for engaging the lower edge of the bumper, the chains being adapted to be passed through the respective end aperture and a link thereof engaging in the respective slot whereby the links on the opposite sides of the link in the slot are at a right angle to the bar to thereby prevent slippage of either chain in the respective slot and a longitudinal extendable spring having its respective ends engaged in a link of the chain and the links between the links engaged by the spring, ends being greater than the normal length of the spring, thereby permitting the bar to assume various angles to the horizontal as the respective automobiles pass over uneven surfaces.

2. An automobile towing device comprising a non-flexible bar rectangular in cross section having the respective ends thereof positioned at an angle to the plane of the bar and adapted to be positioned over the upper edge of the rear bumper of a towing car and the front bumper of a towed car, a chain at each end of the bar each having a hook end to engage the lower edge of the bumper, each chain being secured at one end to the bar, a spring between spaced links of the respective chains between the hook end and portion thereof engaging the bar providing a means for maintaining the bar in pressure contact with the respective bumpers.

3. An automobile towing device comprising a bar having the respective ends thereof positioned at an angle less than a right angle to the plane of the body and extending inwardly and engageable over the upper edge of the respective bumpers of a towed and towing automobile, the bar having an aperture adjacent each end, and slots opening at one end to the apertures and extending inwardly from said end, and a second aperture positioned inwardly of the first named aperture and having a slot extending toward the first named slot, a chain having a hook end to engage under the lower edge of the bumper, a coiled spring secured at each of its ends to a link of the chain, the chain between the respective links engaged by the spring being normally greater in length than the normal length of the spring substantially as described.

4. An automobile towing device comprising a bar having means at each end adapted to engage the inner face of the respective bumpers, whereby a forward car may pull a rear car, means for securing the bar to the bumper comprising a longitudinally flexible element, the bar having apertures to receive an end of the flexible element at points thereon spaced a distance apart greater than the normal length of the flexible element thereby enabling the bar to occupy various angles to the horizontal within the limit permitted by the flexible element substantially as described.

ARTHUR J. ROTH.

REFERENCES CITED

The following references are of record in the file of this patent:

UNITED STATES PATENTS

| Number | Name | Date |
| --- | --- | --- |
| 1,435,064 | Holmes | Nov. 7, 1922 |
| 1,536,751 | Barnes | May 5, 1925 |
| 2,174,468 | Kraftel | Sept. 26, 1939 |
| 2,223,677 | Divelbiss | Dec. 3, 1940 |